(12) United States Patent
Marshall

(10) Patent No.: US 6,492,977 B1
(45) Date of Patent: Dec. 10, 2002

(54) KEYBOARD

(76) Inventor: Timothy John Marshall, 4 Huggins Lane, Welham Green, Hatfield, Hertfordshire, AL9 7LR (GB)

( * ) Notice: Subject to any disclaimer, the term of this patent is extended or adjusted under 35 U.S.C. 154(b) by 0 days.

(21) Appl. No.: 09/171,852

(22) PCT Filed: Apr. 23, 1997

(86) PCT No.: PCT/GB97/01122
§ 371 (c)(1),
(2), (4) Date: Oct. 22, 1998

(87) PCT Pub. No.: WO97/40439
PCT Pub. Date: Oct. 30, 1997

(30) Foreign Application Priority Data

Apr. 24, 1996 (GB) ............................................. 9608571

(51) Int. Cl.$^7$ ................................................. G06F 3/00
(52) U.S. Cl. ........................... 345/168; 380/52; 705/25; 902/20
(58) Field of Search ......................... 345/168; 364/189; 380/52; 705/25; 902/20

(56) References Cited

U.S. PATENT DOCUMENTS

| | | | |
|---|---|---|---|
| 3,956,745 A | | 5/1976 | Ellis ............................ 340/337 |
| 4,007,443 A | * | 2/1977 | Bromberg et al. ........ 340/172.5 |
| 4,145,742 A | | 3/1979 | Olander, Jr. et al. ......... 364/709 |
| 4,185,282 A | | 1/1980 | Pick |
| 4,633,227 A | | 12/1986 | Menn ............................ 341/22 |
| 4,844,637 A | | 7/1989 | Buisson et al. ................. 341/23 |
| 5,581,243 A | * | 12/1996 | Ouellette et al. ............. 345/173 |
| 5,736,976 A | * | 4/1998 | Cheung ....................... 345/168 |
| 6,016,142 A | * | 1/2000 | Chang et al. ................. 345/334 |
| 6,031,471 A | * | 2/2000 | Wilson .......................... 341/22 |

FOREIGN PATENT DOCUMENTS

| | | | |
|---|---|---|---|
| DE | XP2036194 | * | 11/1988 |
| DE | 3 707 049 | | 11/1988 |
| FR | 2 579 137 | * | 9/1986 |

OTHER PUBLICATIONS

Proceedings of the 1966 International Computer Typesetting Conference, 1967, London, GB, pp. 15–17, P. C. Gane et al.: "A New Typewriter Training System". See p. 15 par. 'The Trainer'.

* cited by examiner

Primary Examiner—Bipin Shalwala
Assistant Examiner—Vincent E. Kovalick
(74) Attorney, Agent, or Firm—Bartlett & Sherer; Ronald B. Sherer

(57) ABSTRACT

An improved keyboard comprises a base, and a plurality of keys, and a grid surrounding some of the keys which can be projected onto a screen, and in which some of the keys control the functions of others of the keys.

12 Claims, 4 Drawing Sheets a. 6 key boxes b. 9 key boxes

KeyPage 0

| ESC | | A | B | C | D | | caps |
|---|---|---|---|---|---|---|---|
| Tab | E | F | G | H | I | J | Caps |
| | K | L | M | N | O | P | |
| DEL | Q | R | S | T | U | V | ENT |
| CAPs | ' | W | X | Y | Z | . | Rept |

FIG. 3

KeyPage 1

| ESC | $ | £ | , | % | & | @ | INS |
|---|---|---|---|---|---|---|---|
| Tab | ( | ) | - | 1 | 2 | 3 | Rept |
| | ( | ) | + | 4 | 5 | 6 | |
| Del | { | } | * | 7 | 8 | 9 | ENT |
| Opt | < | > | / | . | 0 | = | Rept |

FIG. 4

KeyPage 2

| ESC | \| | . | ^ | _ | \| | \ | Find |
|---|---|---|---|---|---|---|---|
| Undo | Font | margin | | Head 1 | Head 2 | Head 3 | Fml |
| | Bold | Italics | Under | Font1 | Font2 | Font3 | |
| DEL | NPage | Head' | Foot' | Para1 | Para2 | Para3 | ENT |
| Opts | # | ' | ~ | ; | : | ? | go Tag |

FIG. 5

KEYBOARD

The present invention relates to a keyboard arrangement and control system for computers and similar equipment.

In normal use, computers can be controlled and operated by a combination of a conventional typewriter keyboard, the so-called QWERTY keyboard and a mouse together with optionally other input devices such as light pens for particular applications. For other functions the keyboard has other function and operational keys.

There have been many proposals to change and improve the keyboard in order to make it faster to use and more ergonomic; however, these proposals still require the use of a mouse. Although it is possible to use simultaneous combinations of keys to obviate the use of a mouse and to carry out most of the operations carried out by the mouse, this has not proved satisfactory in use.

I have now devised an improved keyboard which helps to overcome these difficulties with reference to a keyboard representation (KeyGuide) on the screen using the KeyGuide—and still leave other inputs available if necessary.

According to the invention there is provided a keyboard comprising a base on which are mounted a plurality of keys and in which there is a grid on the base which surrounds at least some of the keys, there being means to show on a display unit controlled by the keyboard, a representation of the grid and means to identify, on the display unit, at least some of the keys and their position relative to the grid.

The display unit can comprise any type of display unit for example video display unit, fixed layout on an instrument, paper display or any other display.

The grid, which is referred to herein as a KeyGuide preferably comprises a set of lines that fits the matrices, grid or layout of the keyboard to allow the keys to be represented in a diagram without having to show each key. Each key on the keyboard preferably is able to be located using this diagram, although optionally keys such as the PageSelect keys need not be able to be so located. In use part or all of the keyboard or KeyGuide need only be displayed.

The KeyGuide can be used in several ways, including as a representation of most or all of the keys overlaid on the user's screen; as a KeyGuide icon which represents the key layout which can be described anywhere on the screen as controlled by the application, or as a KeyGuide icon displayed with text and/or icon of the operation to be performed. The KeyGuide can include the background colour and shape as part of the Grid and Icon and although the KeyGuide icon and the prompts on the screen need not be the exact same colour as the KeyGuide on the keyboard the colour is preferably close enough to easily recognised as equivalent. The KeyGuide is specifically adapted so as to be able to identify and locate the individual keys and the KeyGuide can be in the form of a raised line or groove on the keyboard to make location easier. The KeyGuide can be embossed as can be some or all of the keys, alternatively at least some of the keys can be at least partly surrounded by embossing so they can be identified easily by feel. In another embodiment the keyboard can be in the form of a flat keyboard with or without tactile feel which allows the operator's fingers to slide easily over the keys to locate the correct key.

The representation of the KeyGuide can show only part of it where it is more convenient to have a smaller KeyGuide representation.

The KeyGuide can be any shape e.g. rectangular, semi-circular etc. and can appear any shape on the screen e.g. rectangular, so that the representation on the screen is a diagrammatic representation of the KeyGuide with the relative position of the keys shown.

The keyboard preferably has an array or matrix of keys and can comprise a plurality of different groups or matrices of keys which can have different functions.

Preferably there is an array of keys substantially centrally positioned relative to the other keys and the KeyGuide surrounds and delineates a section or sections of these centrally positioned keys. The functions or operations controlled by these keys, herein called 'KeyPage' keys, can be changed by the operation of other keys as is described below.

The KeyPage keys are the general purpose keys which are used in conjunction with the PageSelect keys to form the KeyPage Set which is the full set of operations for a given application e.g. for text control this is letters (KeyPage0), digits (KeyPage1), punctuation and cursor control (KeyPage2), format and layout (KeyPage3) with a spare KeyPage for the user to define. (KeyPage4)

For example, the KeyPage keys can control the alphabet, numbers, punctuation, etc. as in a conventional keyboard and can be used for text control.

The KeyGuide will fit around some of the keys so that on the screen a representation of the Keyboard and KeyGuide will appear. It is then an easy matter for the screen to show what key is operated, or is to be operated by reference to the KeyGuide.

In a preferred embodiment of the invention, there are a plurality of key types in groups, each of which have a specific function or operation. Each group need not be physically located together but all the members of a group have a commonality of function.

The number of different key groups depends on the range of operations and can, for example, be up to 10, e.g. 5. When there are five key types they can optionally be classified as KeyPage, PageSelect, Action Key, Option and Function. In this embodiment the PageSelect keys comprise a group of keys which function in a way which is substantially the same as the shift key in a conventional keyboard and only apply to the KeyPage keys, although selecting a particular KeyPage key may change the "fixed keys".

In practice the various types or groups of keys may have functions which overlap. The Action keys are a subset of the KeyPage keys, i.e. the action of the Action keys depends on which KeyPage they are on.

In general, the PageSelect keys only act on the KeyPage keys (which include the Action keys) but since all the keys are basically reprogrammable, it may be useful in certain circumstances to change the Option keys and optionally the Function keys when a particular KeyPage is selected.

These PageSelect keys can operate on the other key groups changing the operation of the other keys. There need not be a large number of PageSelect keys, as the PageSelect keys gives the KeyPage Sets different functions. The KeyPage keys are the main set of keys and there should be sufficient in number to cover the alphabet and other function keys. Preferably they are present in a matrix, e.g. 6×5. By using a PageSelect key, the number of keys easily accessed is greatly increases as these keys will change the actions of most of the other keys and cause the display to be updated. For simple applications where there are only a few actions the KeyGuide display can be fixed (i.e. no display unit), or an overlay approach used with a different overlay for different tasks.

Using the Text KeyPage Set as an example, to change their function from 'alphabet' to another function, a PageSelect key is operated. Other functions which can be controlled from the KeyPage keys are, for example lists:- lists of files, tag list, windows list and options list. Using the unallocated KeyPage for a list of files (for instance) means that the KeyPage would then be able to display the list required.

Alternatively, an Option key may select a list of all the lists available and the user would select the list required from that list of lists.

The KeyPage keys can be used in place of a mouse; either by using an available KeyPage (e.g. PageSelect 4) or by selecting a mouse substitute KeyPage Set from an Option key or KeyPage key option. Using this KeyPage Set, each KeyPage allows the cursor or mouse pointer to be controlled in a different way.

For instance, using one KeyPage the screen is divided into a number of boxes defined as the same as the number of rows and columns on the keyboard's main KeyPage keys (i.e. not the Action keys), then a key on the KeyPage moves the pointer to the relative box on the screen. The range then reduces in size to cover the smallest of the previous boxes; at each press the available area reduces until the box covers the smallest moves available. The user then has zoomed in on a point starting from a full screen (or document etc.).

Another KeyPage gives each key a direction and step size, and at each keypress of a KeyPage key moves the pointer by the relative amount. Another KeyPage does the same, but repeats until the key is released, or a limit is reached (e.g. the edge of the screen).

An example for text editing the first KeyPage is letters, the KeyPage using PageSelect is digits, the KeyPage using PageSelect 2 is punctuation and cursor control and KeyPage using PageSelect 3 is format control. For a KeyPage set to do that when text is being edited, the text KeyPage set is used. Similarly when a list (including a list of options) is being used or target control (which is equivalent to mouse control) their respective KeyPage Sets are used; particular applications will have their own KeyPage Sets.

The Option and Action keys operation will vary depending on the KeyPage set in use. In general it is convenient for the Option keys to apply to the Application and KeyPage Set in operation and the Action keys to apply only to the KeyPage currently selected (the Action keys are a subset of the KeyPage keys). However, there are certain operations which are common to many sets of operations and these are conveniently placed with the Action keys. Typical of these operations are—Escape, Delete, Enter, Return, Systems Options and Option Select. In some situations 'Yes' or 'No' confirmations can be controlled from the Action keys or from separate Option keys. In general the Option keys are used change the way the KeyPages are set up rather than change individual actions of keys.

Systems Option is the key option which allows the user to select other operations and routines not accessible from particular KeyPage Sets. The other operations and routines for a specific application may not be accessed by other KeyPages or other Option keys or even Function keys. The Option key are fixed keys, not linked with the KeyPage group of keys or normally affected by the PageSelect keys. At least one should be fixed as a System key which is used to control the computer system e.g. to change applications, set system parameters (e.g. normal font type and size), the others may be set with a particular KeyPage Set, so for text an option key might be set to change the current KeyPage Setor one of the KeyPages. (e.g.change the character set or list commonly used words or access files).

The Function keys can operate in a similar way to Function keys in conventional keyboards and can be operated for regularly used functions, e.g. Help function. One of the KeyPage keys may be set up as a help key and used to give help on the KeyPage being valid at the time.

In practice there are three different types of keys, KeyPage keys which are keys with multiple uses and the different uses are controlled by the PageSelect keys; PageSelect keys which are the keys which change the actions of the KeyPage keys and static keys which are not affected by the PageSelect keys. Optionally the keys can be interchangeable. Generally the static keys do not change, particularly the ESCape and System option and are not affected by the PageSelect keys, but since all the keys are user and application programmable, they may not be changed by the PageSelect keys and their main use is to be used for tasks that are needed whatever the KeyPage Set.

The facility of the keys to be programmable enables simpler implementation of regular used tasks such as text entry etc. by having each keypress on the keyboard call up a routine or "Process" which operates that task. The KeyGuide keyboard then in effect becomes a keyboard object. For example in the case of the text KeyPage Set the letter KeyPage uses the letter process which adds the valid character code to the current line and modifies the screen display to include the new letter. The cursor KeyPage control that moves the cursor to the beginning of the line changes the display of the cursor on the screen and adjusts the pointer within the string to the start.

In this way, a program can be broken down into a number of processes of which only a few are valid at anyone time (i.e. the number of keys on the keyboard ). Some of these processes will be to change the current processes (e.g. when a PageSelectKey is pressed they change to the new KeyPage Processes).

There are a number of tasks which the keyboard performs such as text control, drawing control, list or option control, window or panel move/scroll and pointer or cursor control and once these tasks have been designated and their Processes defined they become part of the keyboard object. The task then becomes available to all applications which then become simpler and smaller programs. If desired the application can be defined as a specialist text file and thus the KeyGuide keyboard can make an on board compiler feasible. The invention can lead to a new approach to programming where an action is broken down into small blocks which have a smaller number of options or processes and from which other tasks are selected as needed. This makes it possible to have control embedded in devices. It is accessed by the keyboard which displays the options using KeyGuide and selects the new state for the device.

Preferably in each representation of the keyboard on the screen there is an icon or other identifier for each key for ease of operation. Optionally the display can be indicated by e.g. placing a digit next to the icon or changing the background or other colour of the display or icon or having a menu or display bar along the bottom of the display.

As well as being used with a conventional computer the keyboard of the present invention can be used with a system control for use as a terminal for use e.g. with the "Internet" and can be used in conjunction with a television such as when it is part of an interactive service or with other equipment which is adapted or connected to a system into which instructions etc. are to be transmitted.

The invention is further described with reference to the drawings which show the KeyPages for the Text KeyPage set.

FIGS. 3, 4, 5 and 6 show the section of the keyboard where the grid is in position with different Page Keys, illustrating how it may appear on a screen.

Figure 1:
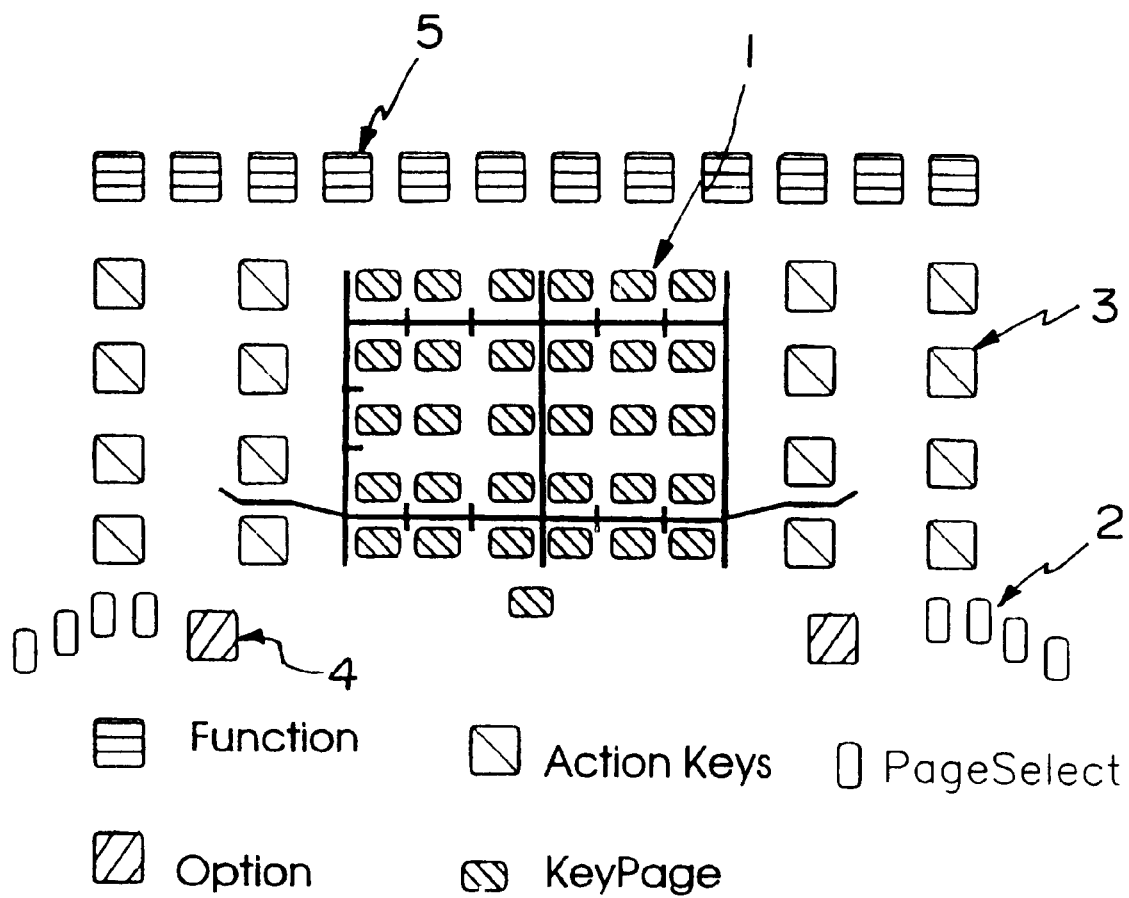
FIG. 1 shows a keyboard.
Figure 2:
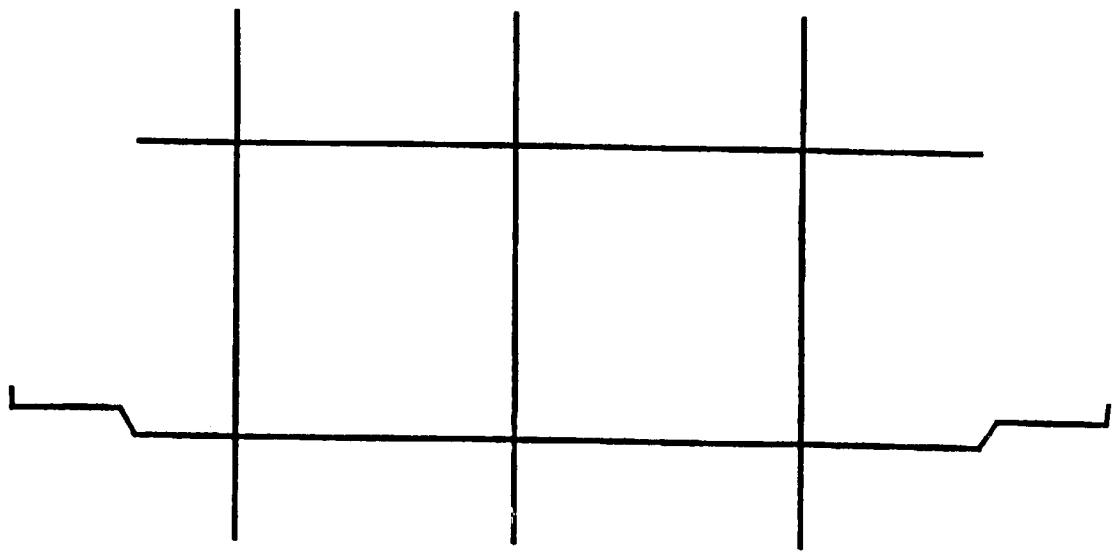
FIG. 2 shows two versions of the KeyGuide separate from the keyboard.
Figure 2:
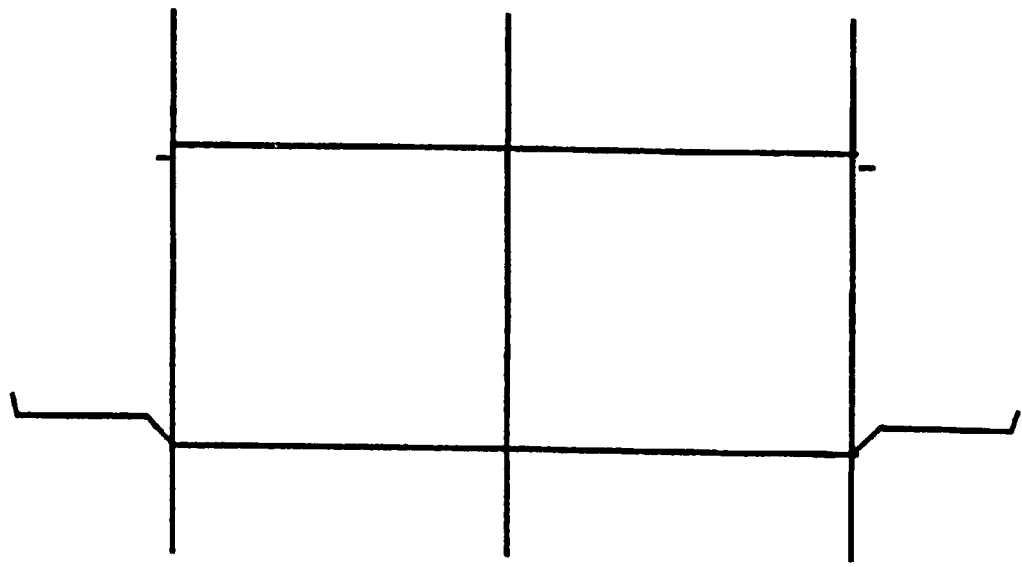
Figure 6:
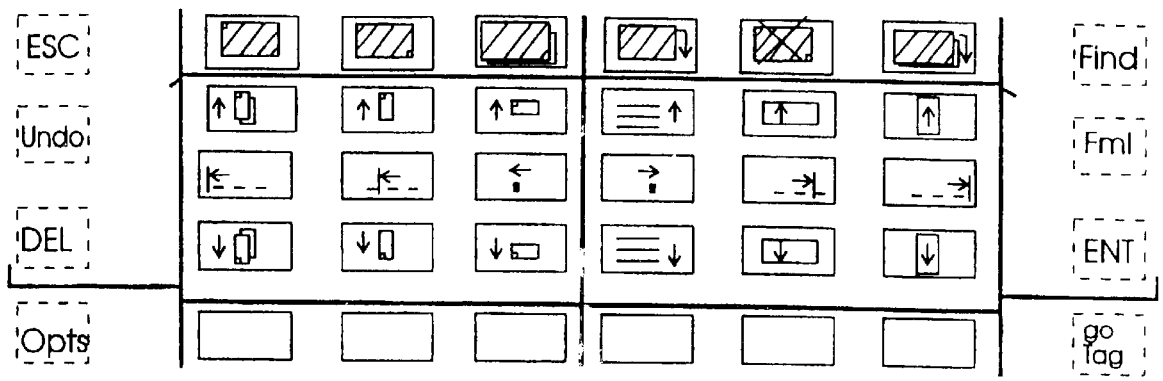

Referring to FIG. 1, the KeyPage keys are shown at (1), the PageSelect keys at (2), the Action keys at (3), the Option keys at (4) and the Function keys at (5). The two sets of PageSelect keys are the same so they can be operated by either hand. Using the example of word processing, with no PageSelect key operated, the keyboard function as in FIG. 3, by activating the PageSelect keys, can function as shown in FIGS. 4, 5 and 6. If further PageSelect keys are operated, lists, etc. can be controlled.

Referring to FIG. 6, the various keys will move the cursor on the screen as shown in the icons which are illustrated, enabling complete rapid control over the cursor without a mouse.

In use, in one embodiment of the invention, the representation of the keyboard will appear in a part of the screen and the document, etc. will appear on one other part of the screen or will be partly overlaid by the representation of the keyboard or the representation may not be displayed at all—when the user knows the key values or has a separate prompt sheet.

Figure 7:
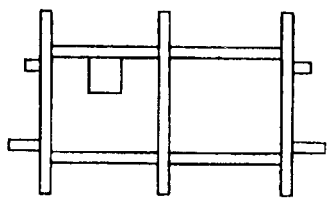
FIG. 7 shows how the KeyGuide on the screen identifies the key which is operated.

Referring to FIG. 7, it can be readily seen how the key operated is easily identified by means of the KeyGuide.

What is claimed is:

1. A keyboard comprising a base on which are mounted a plurality of keys and on which there is a grid on the base which surrounds at least some of the keys, there being means to show on a display unit controlled by the keyboard a representation of the grid, and means to identify on the display unit at least some of the keys and their position relative to the grid, in which the display of the grid can be varied by the addition or omission of part of the displayed grid, and there is an array of keys substantially centrally positioned relative to the other keys and that the function of these keys can be changed by operation of other keys.

2. A keyboard as claimed in claim 1 in which there are a plurality of key types in groups, each of which have a specific function or operation.

3. A keyboard as claimed in claim 1 in which there are five key types and one of said types of keys comprise a group of keys which operate on the other key groups changing the operation of the other keys.

4. A keyboard as claimed in claim 1 in which one of said types are KeyPage keys of sufficient number to cover the alphabet and other function keys.

5. A keyboard as claimed in claim 1 including Option and Action keys the operation of which varies depending on the KeyPage keys in use.

6. A keyboard as claimed in claim 5 in which said Option key is a fixed key, not linked with the KeyPage group of keys, and at least one of the Option keys is fixed as a system key which is used to control the computer system.

7. A keyboard as claimed in claim 1 in which said five key types include KeyPage, PageSelect, Action Key, Option and Function, and said PageSelect keys comprise a group of keys which operate on the other key groups for changing the operation of the other keys.

8. An electronic keyboard for operating a computer comprising a base on which are mounted a plurality of keys and on which there is a grid on the base which surrounds at least some of the keys, said grid being permanent with said base, there being means to show said grid on a video display screen controlled by the keyboard, and means to identify on said display screen at least some of the keys and their position relative to the grid, and including an array of keys substantially centrally positioned relative to the other keys and means for changing the function of said centrally positioned keys by the operation of said other keys and in which keyboard there are five different key types and one of said types of keys comprise a group of keys which operate on the other key groups changing the function of the other keys.

9. A keyboard as claimed in claim 8 in which said five different key types include KeyPage, PageSelect, Action Key, Option and Function, and said PageSelect keys comprise a group of keys which operate on the other key groups for changing the function of the other keys.

10. A keyboard as claimed in claim 9 in which said Option key is a fixed key, not linked with the KeyPage group of keys, and at least one of the Option keys is fixed as a system key which is used to control the computer system.

11. An electronic keyboard for controlling electronic equipment comprising:

(a) a base;
(b) a plurality of at least three different types of keys mounted on said base;
(c) said plurality of keys including at least KeyPage and PageSelect keys;
(d) a raised or depressed grid on said base surrounding said KeyPage keys;
(e) means for displaying said grid on a video screen for viewing by the user;
(f) said PageSelect keys being positioned outside of said grid for controlling said KeyPage keys; and
(g) electronic equipment connected to and controlled by said electronic keyboard.

12. The electronic keyboard of claim 11 wherein said plurality of keys further include at least one of Action keys, Function keys or Option keys positioned outside of said grid.

* * * * *